US008848376B2

(12) United States Patent
Lee

(10) Patent No.: US 8,848,376 B2
(45) Date of Patent: Sep. 30, 2014

(54) LOCK STRUCTURE AND CONTROL MECHANISM AND METHOD THEREOF

(75) Inventor: Chen-Yuan Lee, Shijr (TW)

(73) Assignee: Aten International Co., Ltd., Shijr (TW)

(*) Notice: Subject to any disclaimer, the term of this patent is extended or adjusted under 35 U.S.C. 154(b) by 314 days.

(21) Appl. No.: 13/228,851

(22) Filed: Sep. 9, 2011

(65) Prior Publication Data

US 2012/0176739 A1 Jul. 12, 2012

(30) Foreign Application Priority Data

Jan. 12, 2011 (TW) .............................. 100101156 A

(51) Int. Cl.
H05K 7/16 (2006.01)
G06F 1/16 (2006.01)

(52) U.S. Cl.
CPC .................................. G06F 1/1679 (2013.01)
USPC ................. 361/725; 361/679.57; 361/679.58; 361/724; 361/726; 361/727; 361/732; 361/755; 361/756; 361/801; 361/802; 361/803; 312/208.1; 312/208.2; 312/223.2; 312/223.3; 312/249.1; 312/263; 312/264; 312/270.1; 312/270.2; 312/270.3; 312/332.1; 312/327; 248/205.2; 248/220.21; 248/222.12; 248/222.52; 211/192

(58) Field of Classification Search
USPC ............... 361/679.57, 679.58, 724–727, 732, 361/747, 755, 756, 759, 801–803; 312/208.1, 208.2, 223.2, 223.3, 249.1, 312/263, 264, 270.1–270.3, 332.1, 327; 248/205.2, 220.21, 222.12, 222.52; 211/192
See application file for complete search history.

(56) References Cited

U.S. PATENT DOCUMENTS 4,095,791 A * 6/1978 Smith et al. ..................... 463/44
5,424,912 A 6/1995 Mikan
(Continued)

FOREIGN PATENT DOCUMENTS

CN 1657731 8/2005
CN 10121195 * 7/2008
(Continued)

OTHER PUBLICATIONS

Chinese Office Action, dated Mar. 15, 2013 in a counterpart Chinese patent application, No. CN 201110217039.5.

(Continued)

Primary Examiner — Hung S Bui
Assistant Examiner — James Wu
(74) Attorney, Agent, or Firm — Chen Yoshimura LLP

(57) ABSTRACT

A rack-mounted console module includes a lower unit slideably mounted on a rail and an upper unit pivotally coupled to the lower unit. A locking mechanism includes a first part moveably disposed in the lower unit and a second part fixedly disposed on the rail. When the upper unit is closed and the lower unit slides along the rail to a target position, the first part of the locking mechanism changes from a released state to a locked state where it engages the second part of the locking mechanism to lock the lower unit. When the upper unit is opened, the first part changes from the locked state to a ready-to-released state. When the upper unit is subsequently closed, the first part changes from the ready-to-released state to a released state where it disengages from the second part, and the console module can be slid back into the rack.

20 Claims, 12 Drawing Sheets

(56) References Cited

U.S. PATENT DOCUMENTS

| | | | |
|---|---|---|---|
| 5,433,517 A * | 7/1995 | Fleisch | 312/334.8 |
| 5,460,441 A | 10/1995 | Hastings et al. | |
| 6,353,532 B1 | 3/2002 | Landrum et al. | |
| 6,510,051 B2 * | 1/2003 | Kim | 361/679.43 |
| 6,563,700 B1 | 5/2003 | Waller et al. | |
| 6,600,656 B1 | 7/2003 | Mori et al. | |
| 6,726,164 B1 * | 4/2004 | Baiza et al. | 248/222.12 |
| 6,851,774 B2 * | 2/2005 | Chen et al. | 312/334.47 |
| 6,945,412 B2 | 9/2005 | Felcman et al. | |
| 6,956,735 B2 | 10/2005 | Lee et al. | |
| 7,193,857 B2 | 3/2007 | Robbins et al. | |
| 7,256,986 B2 | 8/2007 | Williams et al. | |
| 7,258,568 B2 | 8/2007 | Shih | |
| 7,405,926 B2 | 7/2008 | Wu et al. | |
| 7,414,853 B2 | 8/2008 | Lee | |
| 7,513,579 B2 | 4/2009 | Nay et al. | |
| 7,551,456 B2 | 6/2009 | Behrens et al. | |
| 7,558,075 B2 | 7/2009 | Nguyen et al. | |
| 7,560,654 B2 * | 7/2009 | Blankemeyer et al. | 200/331 |
| 7,591,383 B1 | 9/2009 | Milton | |
| 7,675,742 B2 | 3/2010 | Wu et al. | |
| 7,755,904 B2 | 7/2010 | Wu et al. | |
| 7,850,013 B1 | 12/2010 | Kramer et al. | |
| 7,894,194 B2 | 2/2011 | Shih et al. | |
| 7,914,332 B2 | 3/2011 | Song et al. | |
| 7,934,607 B2 | 5/2011 | Henderson et al. | |
| 2004/0174100 A1 * | 9/2004 | Chen et al. | 312/333 |
| 2005/0017614 A1 * | 1/2005 | Cirocco et al. | 312/333 |
| 2006/0289370 A1 | 12/2006 | Shih | |
| 2007/0164645 A1 * | 7/2007 | Chen et al. | 312/334.47 |
| 2007/0195496 A1 | 8/2007 | Wu et al. | |
| 2008/0141496 A1 * | 6/2008 | Peng et al. | 16/94 R |
| 2009/0219701 A1 | 9/2009 | Wu et al. | |
| 2010/0053857 A1 | 3/2010 | Zhu et al. | |

FOREIGN PATENT DOCUMENTS

| | | |
|---|---|---|
| CN | 201199336 | 2/2009 |
| CN | 101660555 | 3/2010 |
| TW | 1293724 | 2/2008 |
| TW | 200928137 | 7/2009 |

OTHER PUBLICATIONS

Taiwanese Office Action, dated Jul. 22, 2014, in a counterpart Taiwanese patent application, No. TW 100101156.

* cited by examiner

LOCK STRUCTURE AND CONTROL MECHANISM AND METHOD THEREOF

BACKGROUND OF THE INVENTION

1. Field of the Invention

This invention relates to a rack-mounted console module, and in particular, it relates to a rack-mounted console module having a locking mechanism.

2. Description of the Related Art

With the development information technology and computer industry, the use of computer equipment brings enormous convenience to people. For example, in business offices, computer equipment allows for fast processing and management of information. With the increase of the amount of computer equipment, the placement and management of such equipment becomes important.

Currently, for ease of use and storage, computer equipment can be mounted on racks. When computer equipment is rack-mounted, parts of the use console, such as keyboard module and monitor module, can be affixed on sliding rails so they can slide relative to the rack. This way, when the user wishes to use the console, the user can pull the console module out by using the rails to operate the console module. When the user wishes to return the console module to the rack, the user can push the console module back to the stowed position.

To ensure that the console module is secured at the desired positions when being used or stowed, the console module is often provided with a locking mechanism to secure the console in position. However, conventional locking mechanisms are often hard to use and sometimes can pinch the user's hand. Therefore, there is a need for developing a locking mechanism that is safe and easy to use.

SUMMARY OF THE INVENTION

Accordingly, the present invention is directed to rack-mounted console module that is easy to use and safe.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a rack-mounted console module, which includes: a lower unit, including: a body having an opening; a rotating member pivotally disposed within the body, having a contacting end and a connecting end, the contacting end protruding from the opening of the body; a pushing member coupled to the connecting end of the rotating member; and a hooking member pivotally disposed in the body, and disposed on a path of the pushing member; and an upper unit pivotally coupled to the lower unit to cover or expose the lower unit; wherein when the upper unit covers the lower unit, the upper unit pushes the protruding contacting end of the rotating member to rotate the rotating member in a first direction, the pushing member on the rotating member pushes the hooking member to rotate in a second direction to tilt upwards, wherein the second direction is opposite the first direction.

In another aspect, the present invention provides a rack-mounted console module, which includes: at least one rail; a lower unit slideably mounted on the rail and having a body; an upper unit moveably coupled to the lower unit and moveable between a closed position where the upper unit covers the lower unit and an open position where the upper unit exposes the lower unit; and a locking mechanism, including a first part moveably disposed in the body of the lower unit and a second part fixedly disposed on the rail, wherein the first part has a first trigger member moveably disposed to protrude from the body of the lower unit and is pressed down by the upper unit when the upper unit is in the closed position, and a second trigger member disposed to come into contact with the second part of the locking mechanism when the lower unit is slid to a target position along the rail, wherein the first part of the locking mechanism is moveable among a first state, a second state and a third state, wherein in the second and third states the first part of the locking mechanism engages with the second part of the locking mechanism to lock the lower unit relative to the rail, and in the first state the first part disengages from the second part, wherein the first part of the locking mechanism changes from the first state to the second state when the second trigger member of the first part contacts the second part of the locking mechanism when the lower unit is slid to the target position with the upper unit being in the closed position, changes from the second state to the third state when the upper unit changes from the closed position to the open position where the first trigger member is free from pressure by the upper unit, and changes from the third state to the first state when the upper unit changes from the open position to the closed position where the first trigger member is pressed down by the upper unit.

In another aspect, the present invention provides a method of using a rack-mounted console module, the console module comprising a lower unit slidably mounted on at least one rail and slidable along the rail between a stowed position and an operational position, an upper unit moveably coupled to the lower unit and moveable between a closed position where the upper unit covers the lower unit and an open position where the upper unit exposes the lower unit, and a locking mechanism coupled to the lower unit and the rail, the locking mechanism being moveable among a first state, a second state and a third state, wherein in the second and third states the locking mechanism locks the lower unit relative to the rail and in the first state the locking mechanism unlocks the lower unit relative to the rail, the method including: (a) changing the locking mechanism from the first state to the second state by sliding the lower unit along the rail to the operational position while keeping the upper unit closed; (b) changing the locking mechanism from the second state to the third state by opening the upper unit; and (c) changing the locking mechanism from the third state to the first state by closing the upper unit.

It is to be understood that both the foregoing general description and the following detailed description are exemplary and explanatory and are intended to provide further explanation of the invention as claimed.

BRIEF DESCRIPTION OF THE DRAWINGS

FIG. 3A illustrates the console module in a stowed state; FIG. 3B illustrates the console module in an operation state when it is pulled out along a pair of rails.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

The structures of the console module is described in detail with reference to FIGS. 1A to 2B (first embodiment) and FIGS. 3A to 6F (second embodiment), followed by a description of the open/close operation of the console module with reference to FIG. 7.

Figure 1A:
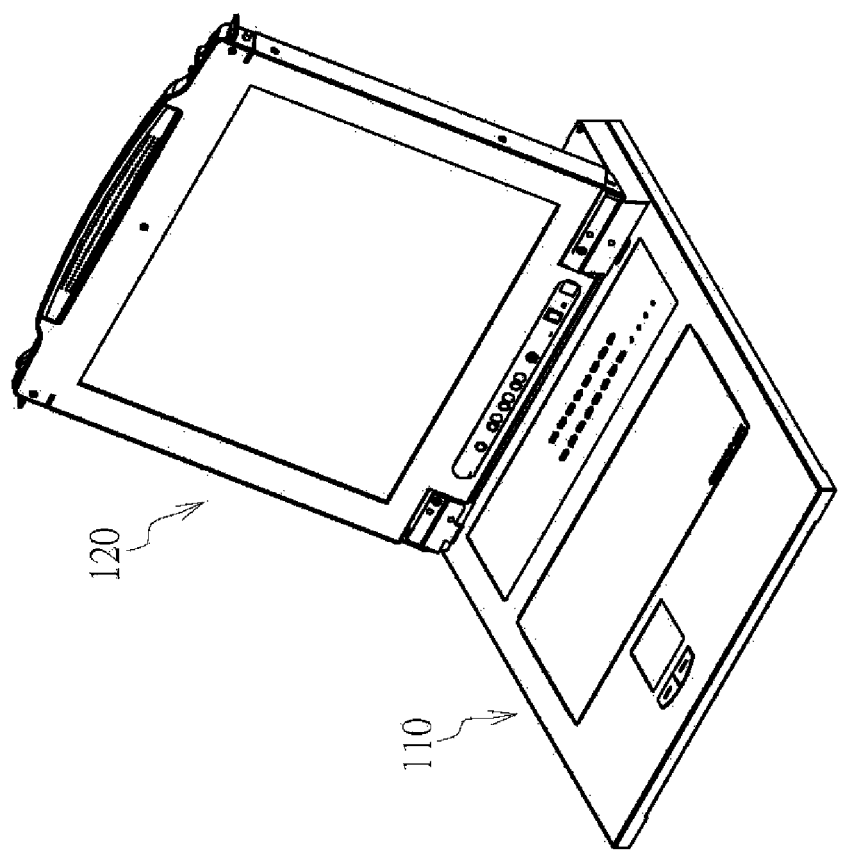
FIG. 1A illustrates a console module according to a first embodiment of the present invention.

Referring to FIG. 1A, a rack-mounted console module 10 according to a first embodiment of the present invention includes a lower unit 110 and an upper unit 120. Each unit has a substantially planar shape. The upper unit 120 is pivotally joined to the lower unit 110 and can cover the lower unit (the upper unit being "closed") or expose the lower unit (the upper unit being "open", as shown in FIG. 1A). In a preferred embodiment, the upper unit is a monitor unit and the lower unit is an input unit including a keyboard and/or a touch pad.

Figure 1B:
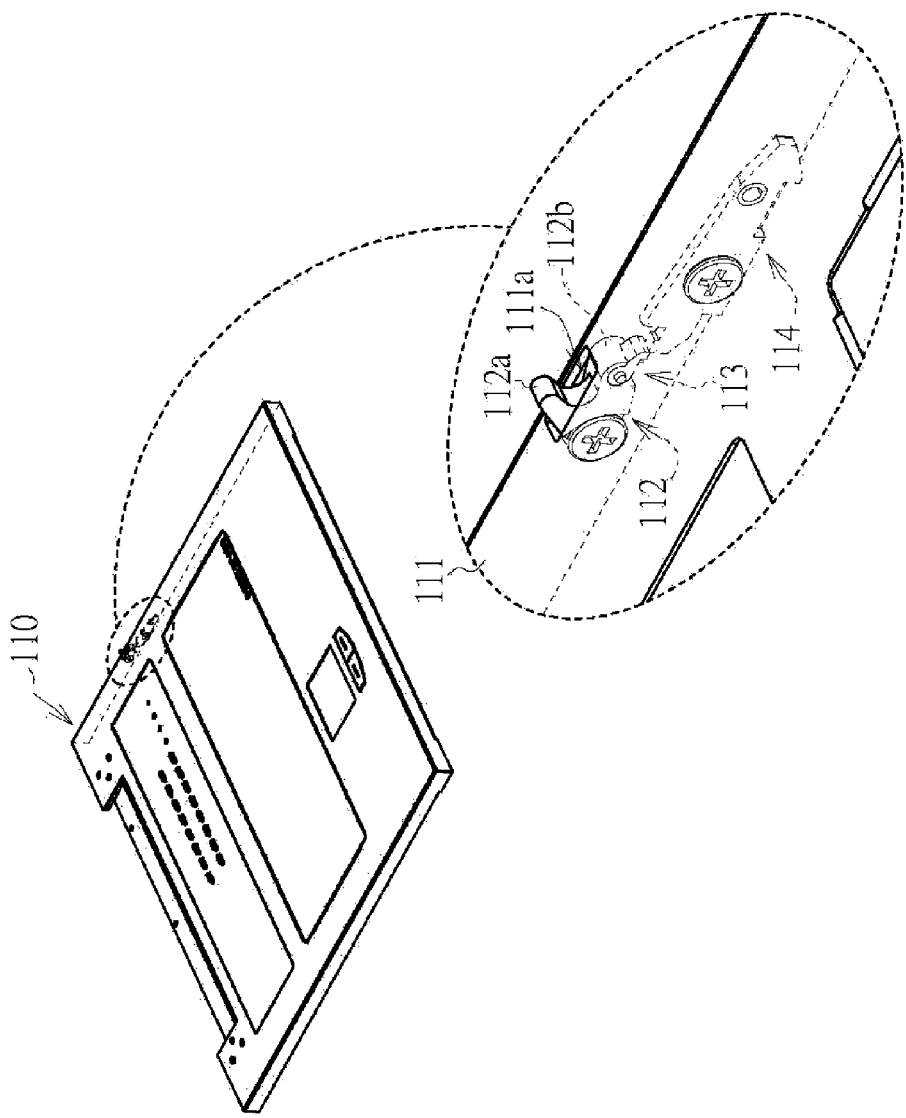
FIG. 1B illustrates details of the lower unit of the console module of FIG. 1A.

As shown in FIG. 1B, the lower unit 110 includes the following structures on a side of its body 111 which constitutes a part of the locking mechanism: a rotating member 112, a pushing member 113, and a hooking member 114. The rotating member 112 is pivotally disposed within a cavity of the body 111, and has a contacting end 112a which can protrude out of the body via an opening 111a. Another end of the rotating member 112 is a connecting end 112b, to which the pushing member 113 is coupled. Both the pushing member 113 and the hooking member 114 are also disposed within the body 111. The hooking member 114 is pivotally coupled to the body 111, and is disposed on a path of the pushing member 113. In other words, when the rotating member 112 rotates, the pushing member 113 moves with the rotating member and pushes the hooking member 114 to rotate.

Figure 2A:
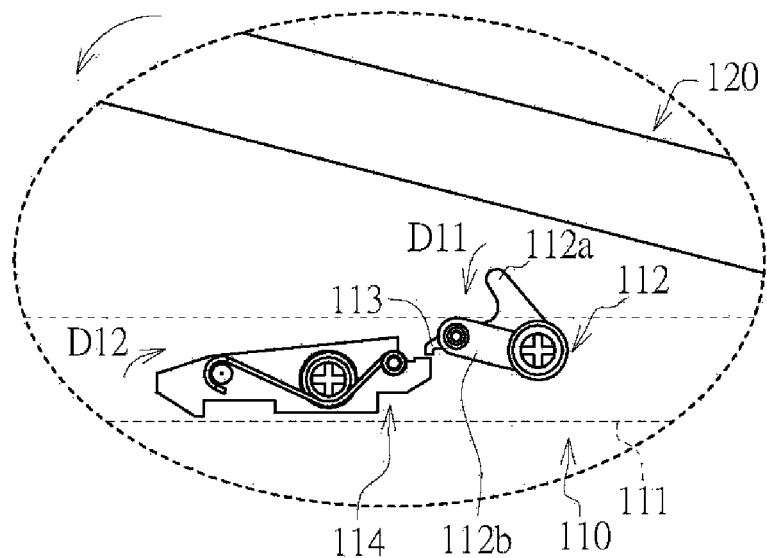
FIGS. 2A and 2B illustrates details of a locking mechanism of the console module of FIG. 1A when the upper unit is in different states.
Figure 2B:
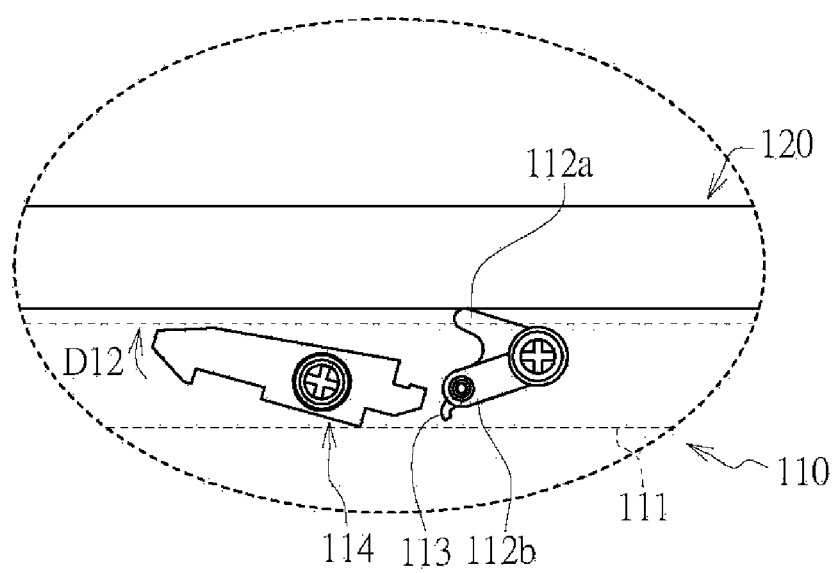

Referring to FIGS. 2A and 2B (side views), when the upper unit 120 is open (FIG. 2A), the contacting end 112a of the rotating member 112 protrudes out of the body 111 (shown in dashed lines). When the upper unit 120 rotates toward the closed position (counter-clockwise rotation in this example), it begins to push the exposed contacting end 112a of the rotating member 112, so that the rotating member begins to rotate in a first direction indicated by the arrow D11 (counter-clockwise in this example). The pushing member 113 pushes the hooking member 114 to rotate in a second direction indicated by the arrow D12 (clockwise in this example). Note that the second direction D12 is opposite to the first direction D11.

As shown in FIG. 2B, when the upper unit 120 is in the closed position (i.e. where the upper unit covers the lower unit), the hooking unit 114 is rotated to a state such that its second end, which is opposite the first end that is pushed by the pushing member 113, is tilted upward.

The second end of the hooking member 114 has a hook shape such that when the hook member is in the un-tilted position (FIG. 2A), it can engage a stationary member (now shown in FIGS. 2A and 2B) to lock the lower unit 110 to prevent the lower unit and the upper unit 120 from sliding with respect to the stationary member. As depicted in FIG. 2B, when the upper unit 120 is in the closed position, it pushes the rotating member 112 which in turn causes the hooking member 114 to tilt upwards to release the lock.

Figure 3A:
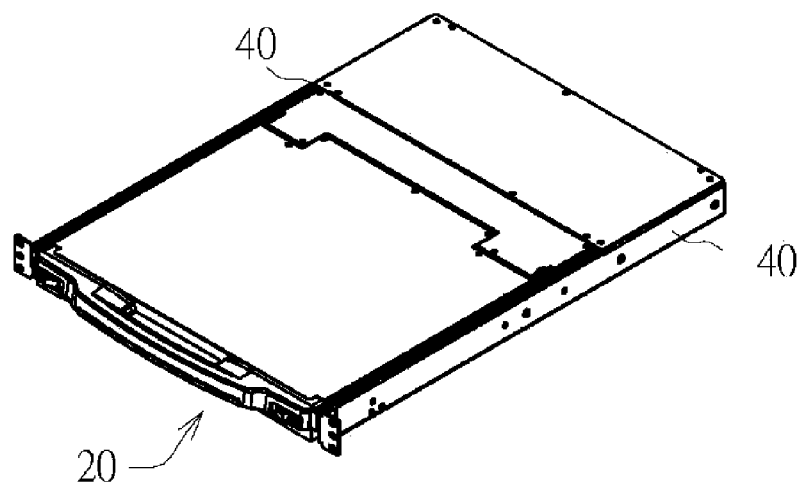
FIGS. 3A and 3B illustrate a console module according to a second embodiment of the present invention.
Figure 3B:
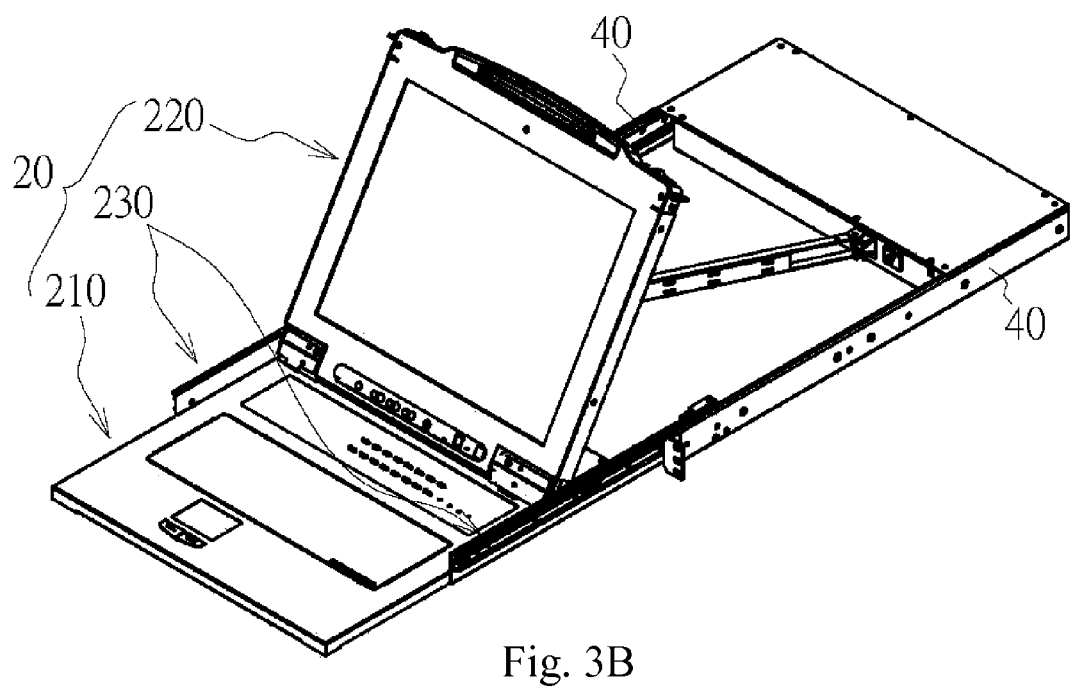
Figure 4:
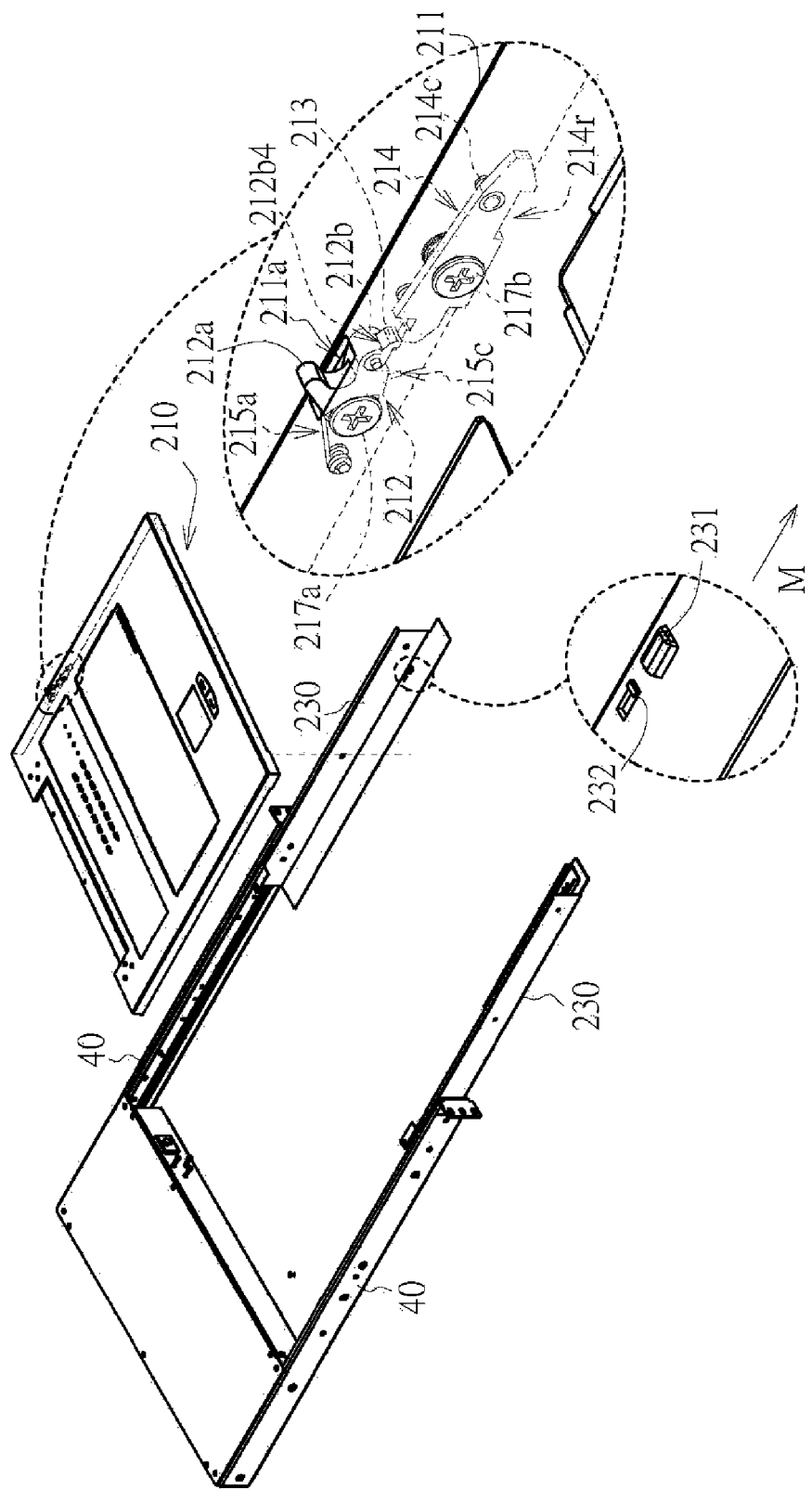
FIG. 4 is an exploded view illustrating various structures of the rails and the lower unit of the console module of the second embodiment.

Referring to FIGS. 3A, 3B and 4, a console module 20 according to a second embodiment of the present invention includes a lower unit 210 and an upper unit 220. Each unit has a substantially planar shape. The upper unit 220 is pivotally joined to the lower unit 210 and can cover the lower unit (upper unit closed) or expose the lower unit (upper unit open). In a preferred embodiment, the upper unit is a monitor unit and the lower unit is an input unit including a keyboard and/or a touch pad.

In addition, the console module 20 includes a pair of sliding rails 230 and the lower unit is slidably coupled to the sliding rails on both sides. The sliding rails 230 are coupled (preferably slidably) to a support component 40 which is a part of the rack. The support component 40 may be used to mount other equipment suck as a keyboard-video-mouse (KVM) switch. FIG. 3A shows the console unit 20 in the stowed state where the upper unit is closed and the lower unit is pushed in toward the rear of support component 40. FIG. 3B shows the consoled unit 20 in an operational position where the upper unit 220 is open and the lower unit 210 is pulled out along the sliding rails 230 away from the support component 40.

FIG. 4 shows, in exploded view, the support component 40, the two sliding rails 230, the lower unit 210, a first part of a locking mechanism disposes within the body 211 of the lower unit, and a second part of the locking mechanism disposed on the sliding rail 230. The first part of the locking mechanism includes a rotating member 212, a pushing member 213, and a hooking member 214, which are similar to the rotating member 112, pushing member 113, and hooking member 114 of the first embodiment (FIG. 1B).

The second part of the locking mechanism includes two protrusions fixedly disposed on an inside-side of one of the rails 230. The first protrusion 231 is a catching member for engaging a hook of the hooking member 214, and the second protrusion 232 is an activating member to activate the hooking member 214 which will be described in more detail later. As shown in FIG. 4, the catching member 231 and the activating member 232 are preferably disposed at a distal end of the rail 230 (i.e. the end farther from the support component 40), with the catching member 231 disposed farther away than the activating member 232.

In the embodiment shown in FIG. 4, the first part of the locking mechanism located on one side of the lower unit 210 and the second part of the locking mechanism is located on the corresponding one of the rails 230. Optionally, a similar locking mechanism (first and second parts) may be provided on the other side of the lower unit 210 and the other rail 230.

Figure 8:
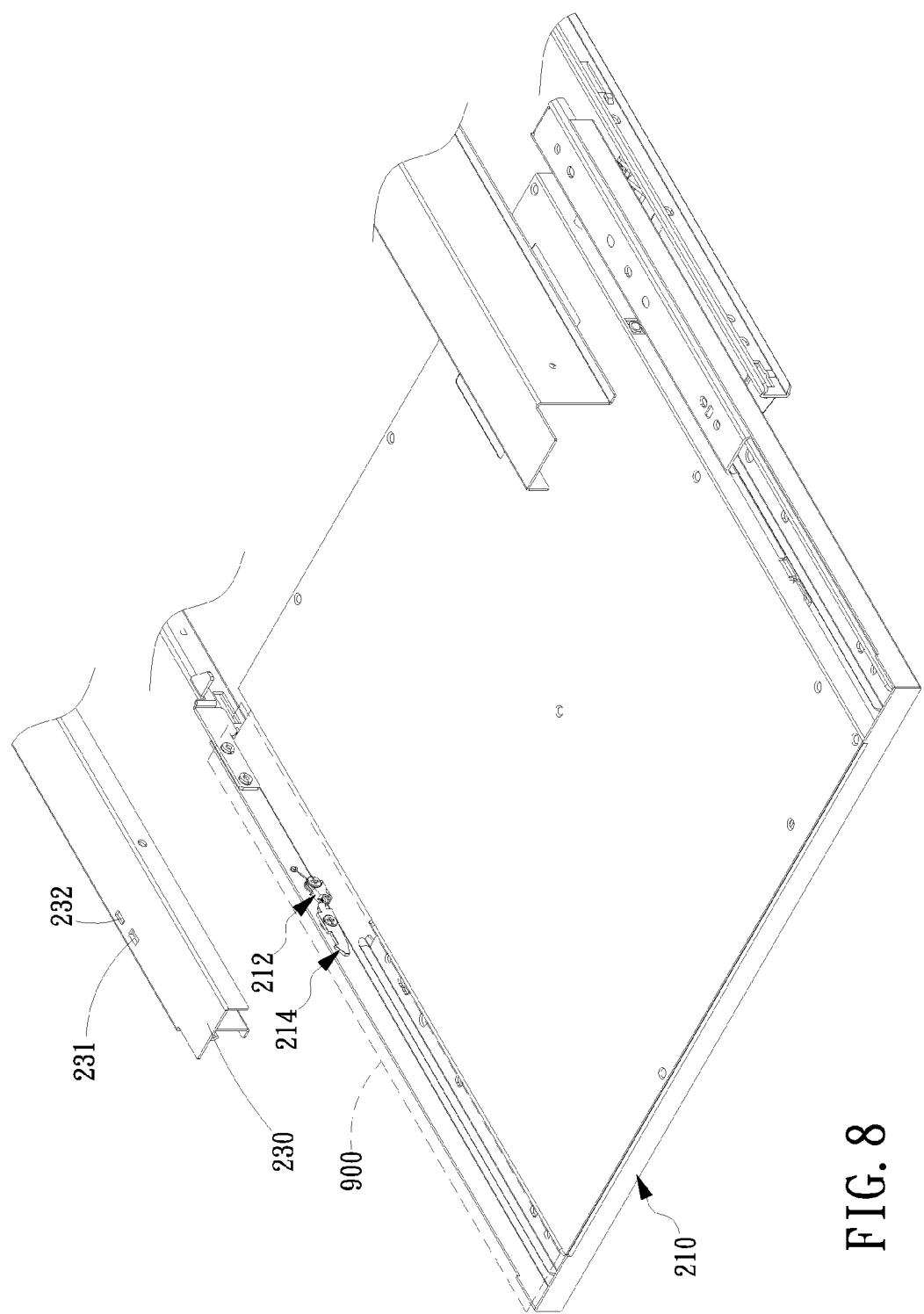
FIG. 8 is an exploded bottom perspective view illustrating various structures of the rails and the lower unit of the console module of the second embodiment.

FIG. 8 is an exploded bottom perspective view showing the lower unit 210 with the rotating member 212 and the hooking member 214, and a part of the sliding rail 230 with the catching member 231 and activating member 232. As shown in FIG. 8, the bottom of the lower unit 210 has an elongated lower opening 900, indicated by the dashed line box, which permits the catching member 231 and the activating member 232 to come into contact with the hooking member 214 as will be described later.

Figure 5A:
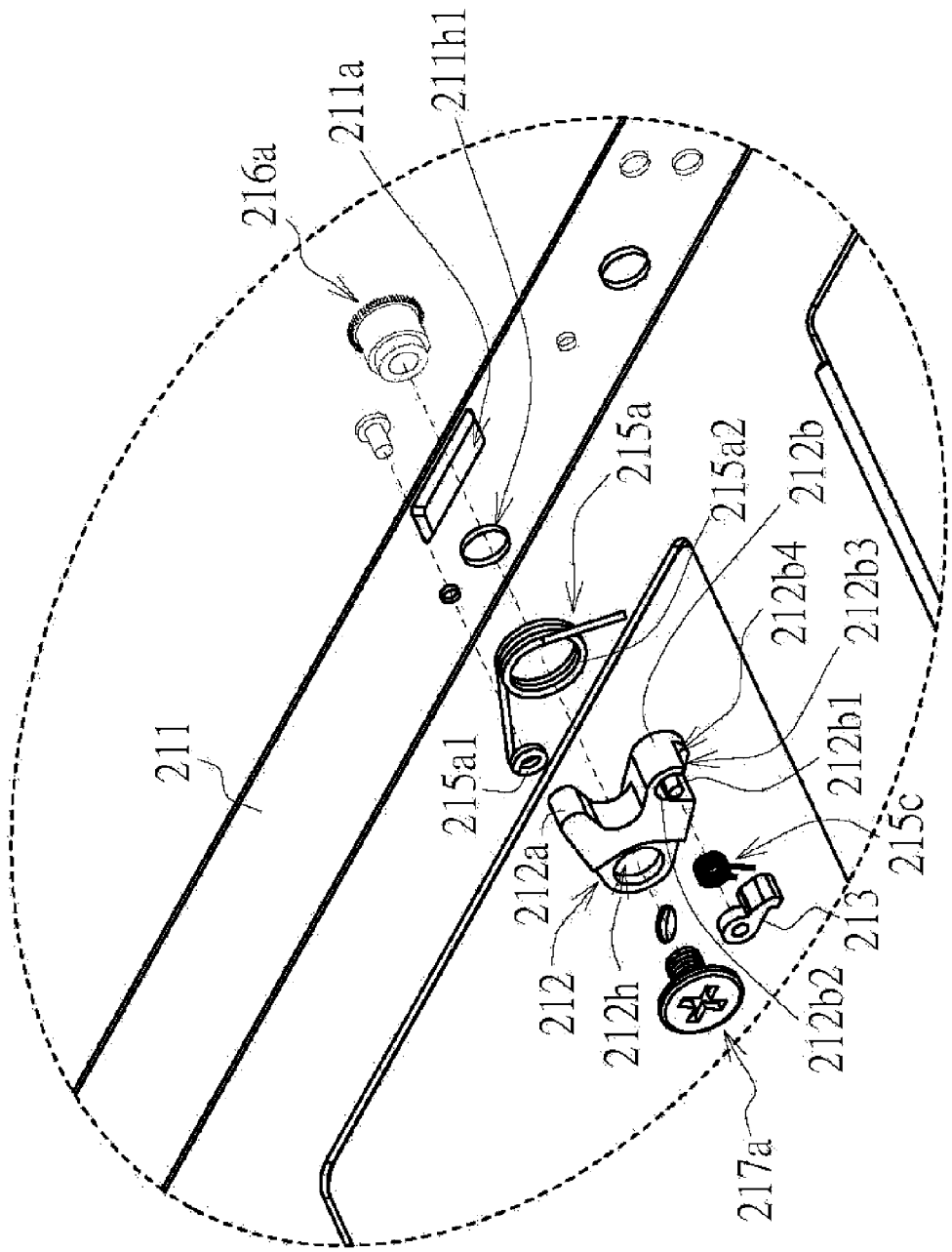
FIGS. 5A and 5B are exploded views illustrating portions of the locking mechanism of the console module of the second embodiment.
Figure 5B:
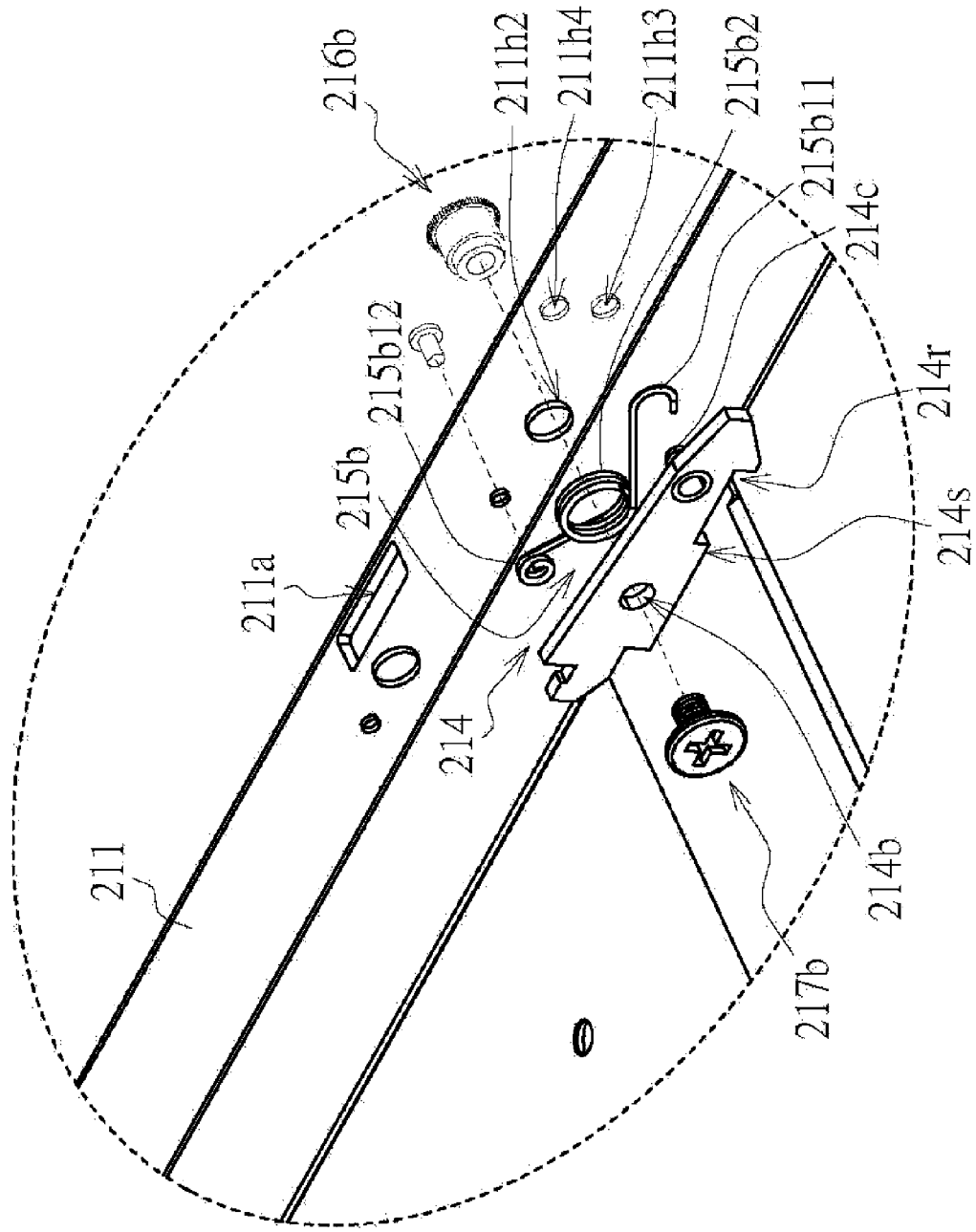

FIGS. 5A and 5B are exploded views showing in more detail the rotating member 212 and related structures, and the hooking member 214 and related structures, respectively. Some components are omitted from FIGS. 5A and 5B to avoid overcrowding.

As shown in FIGS. 5A and 5B, the first part of the locking mechanism further includes resilient members (springs) 215a, 215b and 215c, posts 216a and 216b, and bolts 217a and 217b. The body 211 of the lower unit 210 has through holes 211h1 and 211h2. The spring 215a, posts 216a and bolt 217a couple the rotating member 212 to the body 211 at the through hole 211h1; the spring 215a, posts 216b and bolt 217b couple the hooking member 214 to the body 211 at the through hole 211h2.

As shown in FIG. 5A, the rotating member 212 has a hole 212h. The spring 215a has a connecting part 215a1 and a mounting part 215a2. The connecting part 215a1 is affixed to the body by, for example, a screw. The post 216a passes through the through hole 211h1 of the body 211 and the mounting part 215a2 of the spring 215a. The bolt 217a passes through the hole 212h of the rotating member 212 and is coupled to the post 216a (e.g. by internal threads of the post 216a and external threads of the bolt 217a). This way, the rotating member 212 is pivotally coupled to the body 211 via the post 216a and the bolt 217a. Also, when the rotating member 212 rotates when pushed by the upper unit 220, the spring 215a deforms and urges the rotating member 212 to return to its initial position.

Moreover, the connecting end 212b rotating member has a pin 212b1 and an accommodating cavity 212b2. The pin 212b1 protrudes (in parallel to the hole 212h) from an end of the accommodating cavity 212b2. The accommodating cavity 212b2 has a slot 212b3. The pushing member 213 is pivotally disposed around the pin 212b1 and extends from the slot 212b3. The spring 215c is disposed around the pin 212b1 and coupled to the pushing member 213, such that the spring 215c urges the pushing member 213 against a side surface 212b4 of the slot 212b3.

The contacting end 212a of the rotating member 212 is located on one side of the hole 212h, and the connecting end 212b is located on the same side of the hole 212h. In other words, the contacting end 212a and the connecting end 212b are located on the same side of the rotation axis of the rotating member 212.

As shown in FIG. 5B, the hooking member 214 has a hole 214b and pin 214c. The spring 215b has two connecting parts 215b11 and 215b12, and a mounting part 215b disposed between the two connecting parts. The connecting part 215b11 is mounted around the pin 214c, and the connecting part 215b12 is affixed to the body 211, for example, by a screw. The post 216b passes through the through hole 211h2 of the body 211 and the mounting part 215b2 of the spring 215b. The bolt 217b passes through the hole 214b of the hooking member 214 and couples to the post 216b (e.g. by threads).

The body 211 has two additional holes (or indentations) 211h3 and 211h4. The hooking member 214 has a bottom side 214s and an indentation 214r on the bottom side. When the hooking member 214 rotates, the pin 214c moves between a first position and a second position. At the first position the pin 214c is located in the hole 211h3, and at the second position the pin 214c is located in the hole 211h4.

FIGS. 6A-6F illustrate the various operations of the console module 20 and its locking mechanism. The body 211 of the lower unit is shown in dashed lines. In these figures, the direction to the right is the "in" or closed direction when the console unit is pushed in toward rack, and the direction to the left is the "out" or open direction when the console unit is pulled out of the rack.

Figure 6A:
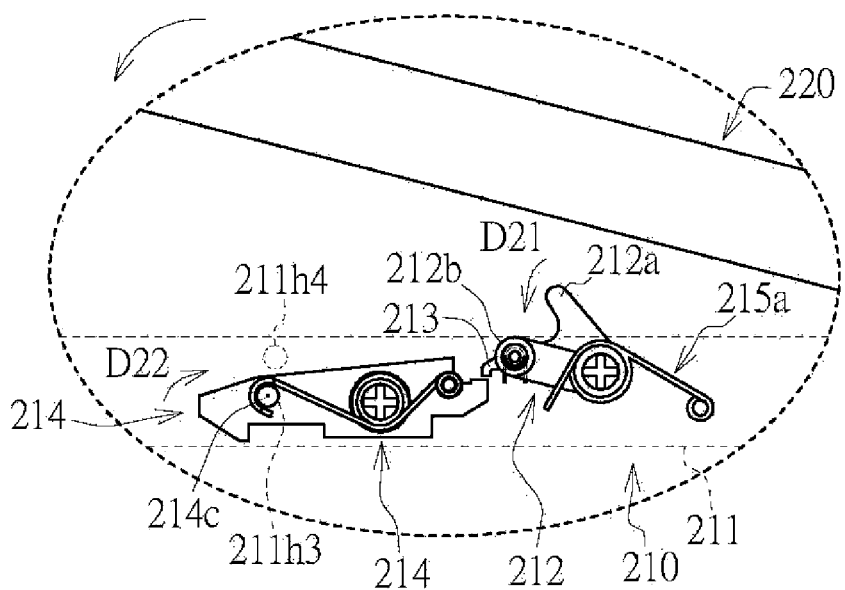
FIGS. 6A to 6F illustrates the locking mechanism of the console module of the second embodiment in various states.

FIG. 6A shows the state where the upper unit 220 of the console module is open, and the contacting end 212a of the rotating member 212 protrudes from the body 211 via the opening 211a (see FIG. 4 for the opening 211a). At this time, the hooking member 214 is located at its first position and the pin 214c is located in the hole 211h3. From this state, when the upper unit 220 is rotated (counterclockwise in this drawing) to the close state, the upper unit 220 pushes the contacting end 212a, causing the rotating member 212 to rotate in a first direction (counterclockwise in this drawing, see arrow D21). In turn, the rotating member 212 carries the pushing member 213 with it to push the hooking member 214. When pushing the hooking member 214, the pushing member 213 is pressed against the side wall 212b4 of a slot 212b3 (see FIG. 5A). This way, the hooking member 214 rotates in a second direction (clockwise in this illustration, see arrow D22) and tilts upwards. The pin 214c is now located in the hole 211h4 of the body 211. This state (the upper unit 220 is completely closed) is shown in FIG. 6B.

Figure 6B:
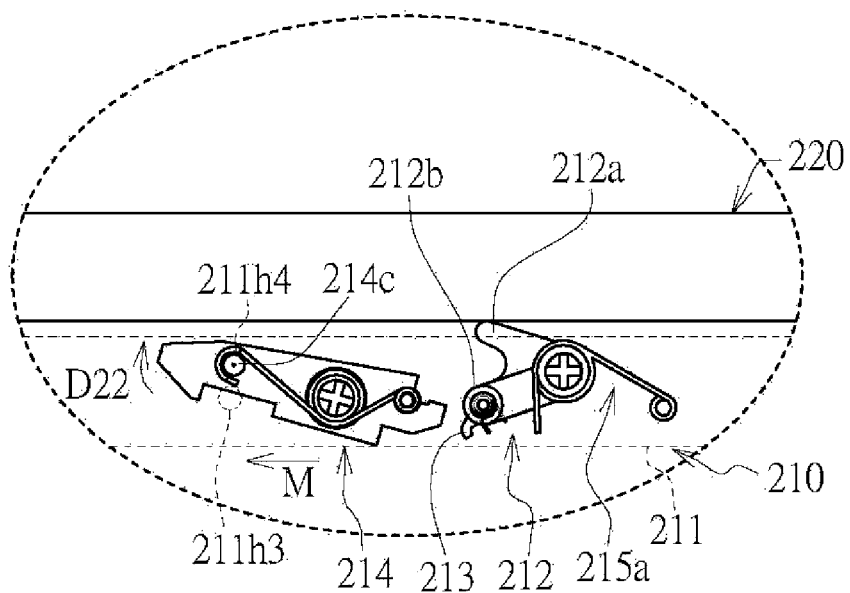

In the state shown in FIG. 6B, the spring 215a coupled to the rotating member 212 deforms, but because the upper unit 220 is pressed against the contacting end 212a, the force of the spring 215a cannot cause the rotating member 212 to return the original position. The spring 215b coupled to the hooking member 214 is also deformed, but because the pin 214c is in the hole 211h4, the force of the spring 215b is insufficient to cause the hooking member 214 to return to the untilted position. In this state, the lower unit 210 is able to move along the rail.

Figure 6C:
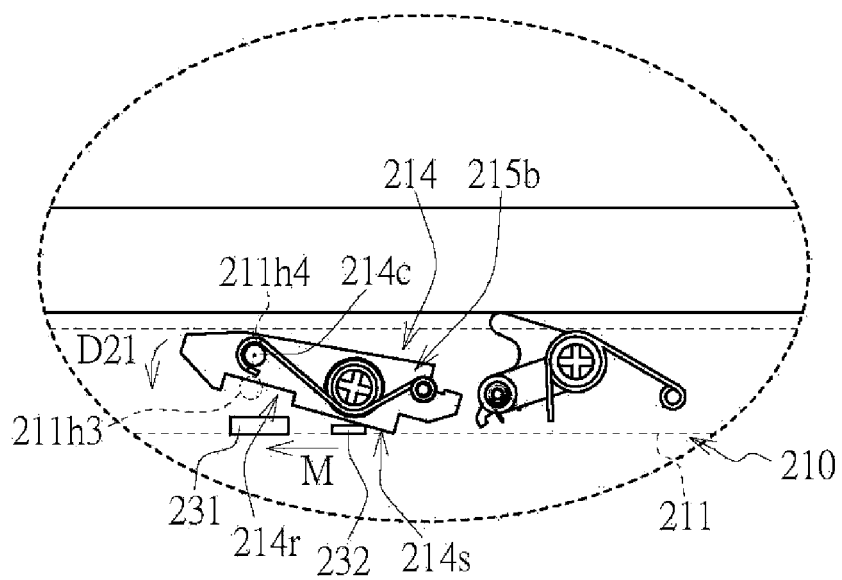

When the lower unit 210, carrying the rotating member 212 and the hooking member 214 in the state shown in FIG. 6B, is moved in the open direction (left in FIGS. 6B and 6C, see arrow M) along the rails 230, it reaches a state shown in FIG. 6C. FIG. 6C shows the catching member 231 and the activating member 232 disposed on the rail 230. When the lower unit 210 is moved in the open direction to a position such that a part of the hooking member 214 contacts the activating member 232, the activating member 232 pushes the hooking member 214 to rotate in the counterclockwise direction. This forces the pin 214c to leave the hole 211h4; the force of the spring 215b now urges the hooking member 214 to rotate (counterclockwise, see arrow D21).

Figure 6D:
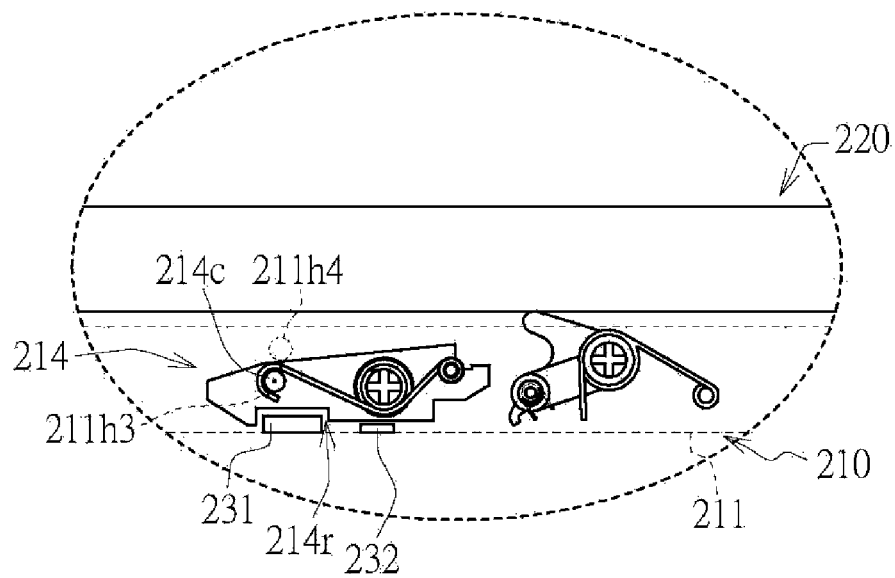

The resulting state is shown in FIG. 6D, where the hooking member 214 returns to the untilted position and the pin 214c falls into the hole 211h3. In the untilted position, the indentation 214r of the hooking member 214 engages the catching member 231, which locks the lower unit 210 and prevents it from sliding along the rail in either direction.

Figure 6E:
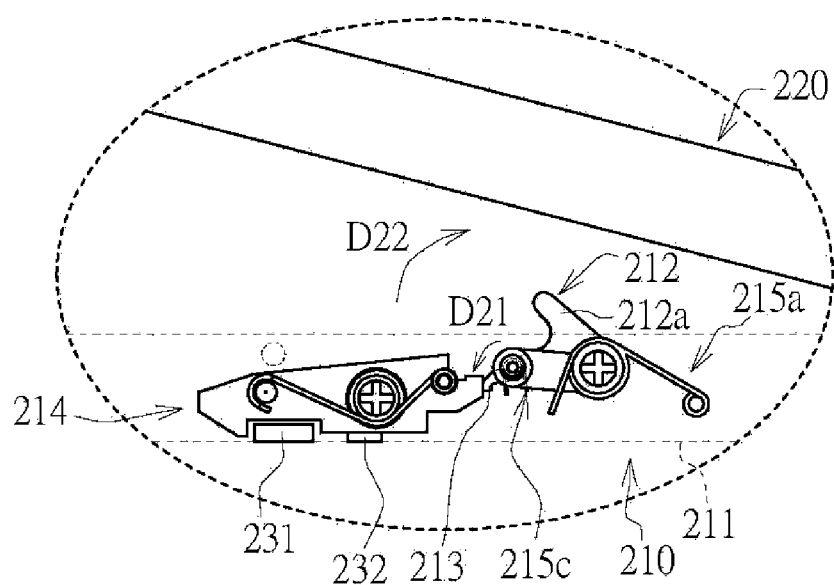

In this state, the user can open the upper unit 220 to use the console module, as shown FIG. 6E, where arrow D22 shows the upper unit 220 rotating in the open direction. As shown in FIG. 6E, because the contacting end 212a of the rotating member is no longer pressed down by the upper unit 220, the force of the spring 215 urges the rotating member 212 to rotate in the second direction (clockwise in this drawing, see arrow D22). When the upper edge of the pushing member 213, carried on the rotating member 212, contacts the hooking member 214, the pushing member 213 is pressed to rotate with respect to the rotating member 212 in the first direction (counterclockwise in this drawing, see arrow D21).

Figure 6F:
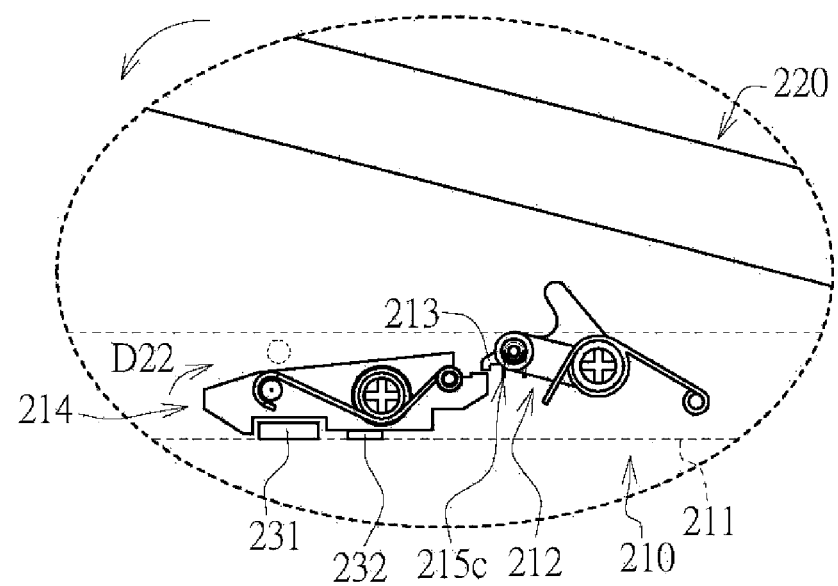

As shown in FIG. 6F, as the rotating member 212 continues to rotate, at a certain point the pushing member 213 is no longer in contact with the hooking member 214. The force of the spring 215c now urges the pushing member 213 to rotate in the second direction (clockwise), so that the pushing member 213 returns to a position where it is located against the side surface 212b4 of the slot 212b3 (see FIG. 5A).

Note that the state of the components 212, 213 and 214 in FIG. 6F are the same as there state in FIG. 6A (although FIG. 6A does not show the catching member 231 and the activating member 232).

When the user finishes operating the console unit 20, the user may close the upper unit 220. The rotating member 212, the pushing member 213 and the hooking member 214 moves in a manner as described earlier with reference to FIGS. 6A and 6B, with the result that the hooking member 214 is tilted upwards. Therefore, the hooking member 214 is disengaged from the catching member 231 and the lock is released. The user may now push the lower unit along the rails to return the console module to its stowed position.

The location of the rotating member 212 (and the corresponding locations of the hooking member 214) with respect to the body 211 described in this embodiment is only an example. Other suitable locations of the rotating member 212 are possible, as long as the rotating member can be pressed down by the upper unit 220 when the upper unit is closed relative to the lower unit 210.

This embodiment shows one locking mechanism (including the rotating member 212, pushing member 213, and hooking member 214 forming the first part, and the activating member 232 and catching member 231 forming the second part) located on one side of the body 211. Multiple sets of locking mechanisms may be provided, on either or both sides of the body 211, as desired.

While the structure of the locking mechanism is illustrated and described in great detail in this disclosure, the locking mechanism is not limited to the illustrated structures. Many changes can be made to achieve the same result.

For example, for the second part of the locking mechanism (see FIG. 6C), the activating member 232 may be moved to a location above and to the left of the catching member 231, and a sloped portion may be provided in the upper-left tip of the hooking member 214, so that when the lower unit 210 slides along the rails 230, the sloped portion of the hooking member encounters the activating member, triggering the hooking member to rotate in the counterclockwise direction and engage the catching member. Other alternative structures may be designed, so long as they achieves the function of causing the first part of the locking mechanism to engage the second part of the locking mechanism as the lower unit slides to a target position.

More generally, the console module according to embodiments of the present invention has a locking mechanism that includes a first part moveably disposed in the lower unit, and a second part fixedly disposed on the corresponding rail. The first part has two trigger members; the first trigger member (e.g. the contact end 212a of the rotating member 212) is moveably disposed to protrude from the body of the lower unit and can be pressed down by the upper unit when the upper unit is closed, and the second trigger member (e.g. the hooking member 214) is disposed to come into contact with the second part of the locking mechanism when the lower unit is slid to a target position along the rail. The first part of the locking mechanism is moveable among three states: a released state (e.g., FIGS. 6B/6C), a locked state (e.g., FIG. 6D), and a locked-and-ready-to-release state (e.g., FIG. 6F). In the locked state and the locked-and-ready-to-release state, the first part is engaged with the second part to prevent the lower unit from sliding along the rails. In the released state, the first part is disengaged from the second part to allow the lower unit to slide. The change from the released state to the locked state is triggered by contact of the first part (more specifically, the second trigger member) with the second part of the locking mechanism due to the lower unit being slid to the target position while the upper unit is closed. The change from the locked state to the locked-and-ready-to-release state is triggered by the opening of the upper unit, more specifically, when the upper unit does not press down the first trigger member. The change from the locked-and-ready-to-release state to the released state is triggered by the closing of the upper unit, more specifically, when the upper unit presses the first trigger member.

These structures allow the lower unit (and hence the entire console module) to be locked with respect to the rails solely by sliding the lower unit relative to the rails to a target position, without requiring any other action. It allows the lock to be released solely by opening and then closing upper unit, without requiring any other action.

Figure 7:
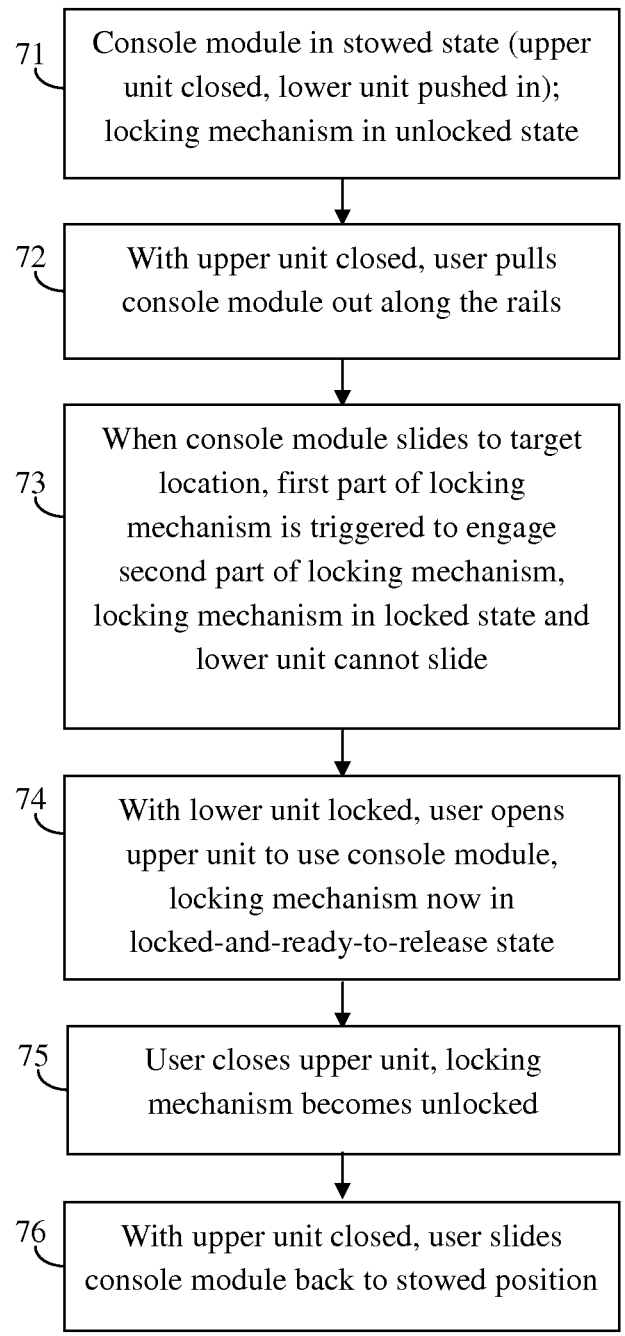
FIG. 7 illustrates a method of using the console module.

FIG. 7 illustrates an example of the use of the console module 20. When not in use, the console is in the stowed state (state 71), as shown in FIG. 3A, where the upper unit is closed and the lower unit is pushed in toward the rear of support component 40. The first part of the locking mechanism is in the released state as shown in FIG. 6B, where the hooking member 214 is tilted upward.

Then, with the upper unit still closed, the user pulls the console module out along the rails (step 72). The first part of the locking mechanism remains in the release state during the sliding motion. This is shown in FIG. 6B where the arrow M (pointing to the left) indicates the direction of movement of the console module.

Still with the upper unit closed, when the console module is slid to a target position of the rails, the first part of the locking mechanism (specifically, the hooking member 214) is triggered by the activating member 232 (see FIG. 6C) and moves to the locked state where the hooking member 214 is untilted and engages the catching member 231 (see FIG. 6D) (step 73). The first part of the locking mechanism is now in the locked state as shown in FIG. 6D, and the lower unit is locked and cannot slide along the rails. The locations of the first part of the locking mechanism (212, 213, 214) and the second part of the locking mechanism (231, 232) are designed so that the first part of the locking mechanism is triggered when the console module is slid to a desired operation location.

At this time, the user opens the upper unit 220 by rotating it upwards (in the clockwise direction in FIG. 6F) (step 74). The hooking member 214 remains in the untilted position to lock the lower unit, while the rotating member 212 moves to a position where it protrudes from the body 211, as shown in FIG. 6E (a temporary state) and FIG. 6F (a stable state). Note that the locked-and-ready-to-release state shown in FIG. 6F is different from the state shown in FIG. 6D which is a locked state but not ready to release.

With the upper unit fully open (see FIG. 3B), the user can use the console module. During the step of opening the upper unit (step 74) and using the console module, the lower unit is locked and cannot slide along the rails.

When the user finishes using the console module, the user closes the upper unit (step 75). When the upper unit is sufficiently closed, the hooking member 214 moves to the tilted position via the motion of the rotating member 212 and the pushing member 213. The locking mechanism is now unlocked; the state of the locking mechanism is as shown in FIG. 6C.

With the upper unit now closed and the locking mechanism unlocked, the user pushes the console module back toward the stowed position (step 76). This completes one use cycle.

From the above descriptions, it can be seen that in the rack-mounted console modules of embodiments of the present invention, the user can use the act of sliding the lower unit to cause the lower unit to lock, and use the act of opening and closing the upper unit to cause the locking mechanism to unlock. Sliding the lower unit and opening/closing the upper unit are motions that the user will inherently perform as a part of using the console module; no additional action is required to lock or unlock the lower unit. The operation of the rack-mounted console module is convenient and easy, and enhances safety.

It will be apparent to those skilled in the art that various modification and variations can be made in the rack-mounted console module of the present invention without departing from the spirit or scope of the invention. Thus, it is intended that the present invention cover modifications and variations that come within the scope of the appended claims and their equivalents.

What is claimed is:

1. A rack-mounted console module, comprising:
a first rail, having a catching member disposed thereon;
a lower unit slideably mounted on the first rail, including:
  a body having an opening;
  a rotating member pivotally disposed within the body, having a contacting end and a connecting end, the contacting end protruding from the opening of the body;
  a pushing member coupled to the connecting end of the rotating member; and
  a hooking member pivotally disposed in the body, and disposed on a path of the pushing member; and
an upper unit pivotally coupled to the lower unit to cover or expose the lower unit;
wherein when the upper unit covers the lower unit, the upper unit pushes the protruding contacting end of the rotating member to rotate the rotating member in a first direction, the pushing member on the rotating member exerting a pushing force on the hooking member to cause it to rotate by the pushing force in a second direction to tilt upwards, wherein the second direction is opposite the first direction, wherein when the hooking member is tilted upwards, it changes from a state where the hooking member is engaged with the catching member of the first rail to a state where the hooking member is disengaged from the catching member to allow the lower unit to slide along the first rail, and wherein the body further has a lower opening to permit the catching member to contact the hooking member.

2. The rack-mounted console module of claim 1, comprising two rails including the first rail and a second rail, wherein the lower unit is slideably mounted on and between the two rails, and wherein the first rail further has a activating member disposed thereon.

3. The rack-mounted console module of claim 2, wherein when the hooking member is tilted upwards and the lower unit slides along the two rails, the hooking member contacts the activating member and rotates in the first direction to engage the catching member, wherein the lower opening of the body permits the activating member to contact the hooking member.

4. The rack-mounted console module of claim 3, wherein the rotating member includes a pin located on the connecting end, wherein the pushing member is pivotally disposed around the pin,
  wherein the lower unit further includes a resilient member disposed around the pin and coupled to the pushing member, for urging the pushing member to rotate in the second direction;
  wherein when the hooking member engages the catching member and the upper unit exposes the lower unit, the rotating member rotates in the second direction while carrying the pushing member, the pushing member rotates in the first direction relative to the rotating member when the pushing member contacts the hooking member, and the pushing member subsequently rotates in the second direction under a force of the resilient member.

5. The rack-mounted console module of claim 4, wherein the connecting end of the rotating member has an accommodating cavity with an end, a slot and a side wall, wherein the pin protrudes from the end of the accommodating cavity, the pushing member protrudes from the slot, and the pushing member is urged against the side wall by the resilient member.

6. The rack-mounted console module of claim 3, wherein the catching member is disposed between to a distal end of the rail and the activating member.

7. The rack-mounted console module of claim 3, wherein the hooking member has a bottom side with an indentation, wherein the bottom side contacts the activating member to trigger the hooking member to rotate in the first direction, and wherein the indentation engages the catching member when the hooking member is rotated in the first direction.

8. The rack-mounted console module of claim 1, wherein the hooking member includes a pin, wherein the body includes a first hole and a second hole, wherein when the hooking member rotates, the pin moves between a first position where the pin is located in the first hole and a second position where the pin is located in the second hole.

9. The rack-mounted console module of claim 1, wherein the hooking member has a hole and a pin, wherein the body has a through hole, and wherein the lower unit further includes:
  a resilient member having two connecting parts and a mounting part located between the two connecting parts, the two connecting parts being mounted on the pin and to the body, respectively;
  a post passing through the through hole of the body and the mounting part of the resilient member; and
  a bolt passing through the hole of the hooking member and coupled to the post.

10. The rack-mounted console module of claim 1, wherein the rotating member has a hole, wherein the body has a through hole, and wherein the lower unit further includes:
  a resilient member having a connecting part and a mounting part, the connecting part being mounted to the body;
  a post passing through the through hole of the body and the mounting part of the resilient member; and
  a bolt passing through the hole of the rotating member and coupled to the post.

11. The rack-mounted console module of claim 10, wherein the contacting end and the connecting end of the rotating member are located on a same side of the hole of the rotating member.

12. A rack-mounted console module, comprising:
at least one rail;
a lower unit slideably mounted on the rail and having a body;

an upper unit moveably coupled to the lower unit and moveable between a closed position where the upper unit covers the lower unit and an open position where the upper unit exposes the lower unit; and a locking mechanism, including a first part moveably disposed in the body of the lower unit and a second part fixedly disposed on the rail, wherein the first part has a first trigger member moveably disposed to protrude from the body of the lower unit and is pressed down by the upper unit when the upper unit is in the closed position, and a second trigger member disposed to come into contact with the second part of the locking mechanism when the lower unit is slid to a target position along the rail, wherein the first part of the locking mechanism is moveable among a first state, a second state and a third state, wherein in the second and third states the first part of the locking mechanism engages with the second part of the locking mechanism to lock the lower unit relative to the rail, and in the first state the first part disengages from the second part, wherein the first part of the locking mechanism changes from the first state to the second state when the second trigger member of the first part contacts the second part of the locking mechanism when the lower unit is slid to the target position with the upper unit being in the closed position, changes from the second state to the third state when the upper unit changes from the closed position to the open position where the first trigger member is free from pressure by the upper unit, and changes from the third state to the first state when the upper unit changes from the open position to the closed position where the first trigger member is pressed down by the upper unit.

13. The rack-mounted console module of claim 12, wherein the first part of the locking mechanism includes:

a rotating member pivotally disposed within the body, having a contacting end and a connecting end, the contacting end forming the first trigger member;

a pushing member coupled to the connecting end of the rotating member; and a hooking member pivotally disposed in the body and disposed on a path of the pushing member, the hooking member forming the second trigger member, the hooking member engaging the second part of the locking mechanism in the second and third state of the first locking mechanism.

14. The rack-mounted console module of claim 13, wherein when the first part changes from the third state to the first state, the rotating member rotates in a first direction and the hooking member rotates in a second direction opposite the first direction, and when the first part changes from the second state to the third state, the rotating member rotates in the second direction and the hooking member remains unmoved.

15. The rack-mounted console module of claim 14, wherein the pushing member is pivotally coupled to the connecting end of the rotating member and rotates relative to the rotating member when the first part changes from the second state to the third state.

16. The rack-mounted console module of claim 13, wherein the second part of the locking mechanism includes an activating member that contacts the hooking member when the lower unit slides to the target position, and a catching member that engages the hooking member when the first part of the locking mechanism is in the second and third states, and wherein the hooking member is tilted upwards in the first state, and is untilted in the second and third states to engage the catching member.

17. The rack-mounted console module of claim 12, wherein the lower unit has a keyboard and the upper unit has a monitor.

18. A method of using a rack-mounted console module, the console module comprising a lower unit slidably mounted on at least one rail and slidable along the rail between a stowed position and an operational position, an upper unit moveably coupled to the lower unit and moveable between a closed position where the upper unit covers the lower unit and an open position where the upper unit exposes the lower unit, and a locking mechanism coupled to the lower unit and the rail, the locking mechanism being moveable among a first state, a second state and a third state, wherein in the second and third states the locking mechanism locks the lower unit relative to the rail and in the first state the locking mechanism unlocks the lower unit relative to the rail, the method comprising:

(a) changing the locking mechanism from the first state to the second state by sliding the lower unit along the rail to the operational position while keeping the upper unit closed;

(b) changing the locking mechanism from the second state to the third state by opening the upper unit; and (c) changing the locking mechanism from the third state to the first state by closing the upper unit.

19. The method of claim 18, further comprising:

after step (c), when the locking mechanism is in the first state, sliding the lower unit to the stowed position.

20. The method of claim 18, wherein the lower unit has a keyboard and the upper unit has a monitor, and wherein the method further comprises:

after step (b), operating the keyboard of the console module.

* * * * *